United States Patent [19]

Wedman

[11] 4,286,892
[45] Sep. 1, 1981

[54] MOUNTING ASSEMBLY FOR AN AGRICULTURAL IMPLEMENT

[75] Inventor: Thomas W. Wedman, Harper, Kans.
[73] Assignee: Green Line, Inc., Harper, Kans.
[21] Appl. No.: 28,454
[22] Filed: Apr. 9, 1979
[51] Int. Cl.³ ............................................. F16B 2/02
[52] U.S. Cl. ................................. 403/262; 403/387
[58] Field of Search ............... 403/337, 338, 335, 336, 403/262, 199, 387

[56] References Cited

U.S. PATENT DOCUMENTS

| | | |
|---|---|---|
| 986,506 | 3/1911 | Sargent . |
| 1,156,493 | 10/1915 | Rice . |
| 1,186,621 | 6/1916 | Townsend . |
| 1,525,647 | 2/1925 | Haughey . |
| 2,653,834 | 9/1953 | Purkhiser . |
| 2,868,576 | 1/1959 | Boughton . |
| 3,016,635 | 1/1962 | Aston ................................. 403/337 |
| 3,165,341 | 1/1965 | Burns et al. . |
| 3,185,511 | 5/1965 | Wochner et al. . |
| 3,418,009 | 12/1968 | Pollia . |
| 3,833,067 | 9/1974 | Peterson, Jr. et al. . |
| 3,837,408 | 9/1974 | Green et al. . |
| 3,912,019 | 10/1975 | Baughman . |
| 3,967,685 | 7/1976 | Siekmeier . |
| 4,054,392 | 10/1977 | Oppenheim ........................ 403/262 |

FOREIGN PATENT DOCUMENTS

| | | |
|---|---|---|
| 67611 | 7/1929 | Sweden . |
| 244747 | 5/1947 | Switzerland ............................ 403/377 |
| 918242 | 2/1963 | United Kingdom . |

Primary Examiner—Andrew V. Kundrat
Attorney, Agent, or Firm—Oblon, Fisher, Spivak, McClelland & Maier

[57] ABSTRACT

A mounting assembly for an agricultural implement utilizing a frame member having a first surface portion and adjacent opposing side portions, at least one pair of flange members extending from the opposing side portions, at least one pair of L-shaped clamp members engaging the at least one pair of flange members, each having apertures formed therein, a support member having at least one surface portion engaging the first surface portion and the at least one pair of L-shaped clamp members and including first and second apertures formed therein and disposed opposite the apertures in the at least one pair of L-shaped clamp members and securing members mounted within the apertures for connecting the support member and the frame member.

20 Claims, 3 Drawing Figures

MOUNTING ASSEMBLY FOR AN AGRICULTURAL IMPLEMENT

BACKGROUND OF THE INVENTION

1. Field of the Invention

This invention relates to a mounting assembly for an agricultural implement and particularly to a mounting assembly which allows for easy attachment and removal of an agricultural implement from a frame member.

2. Description of the Prior Art

Heretofore, implement-supporting members normally have been provided on a transportable frame through the use of a large number of nut and bolt securing members. As a result, mounting and removal of the agricultural implement from the basic frame member has been very time consuming and inconvenient for the operator. Moreover, the expense involved in utilizing a large number of securing members has resulted in efforts to provide a mounting assembly for agricultural implements which is both inexpensive and which securely mounts the agricultural implement to a frame member in a reliable and time efficient manner.

SUMMARY OF THE INVENTION

It is an object of the present invention to provide a mounting assembly for an agricultural implement which can quickly and reliably secure the agricultural implement to a transportable frame member.

It is a further object of the present invention to provide a mounting assembly for an agricultural implement which utilizes a minimal number of structural elements but which provides for a securing mounting thereof in accordance with standards provided by conventional mounting assemblies.

BRIEF DESCRIPTION OF THE DRAWINGS

Various other objects, features and attendant advantages of the present invention will be better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
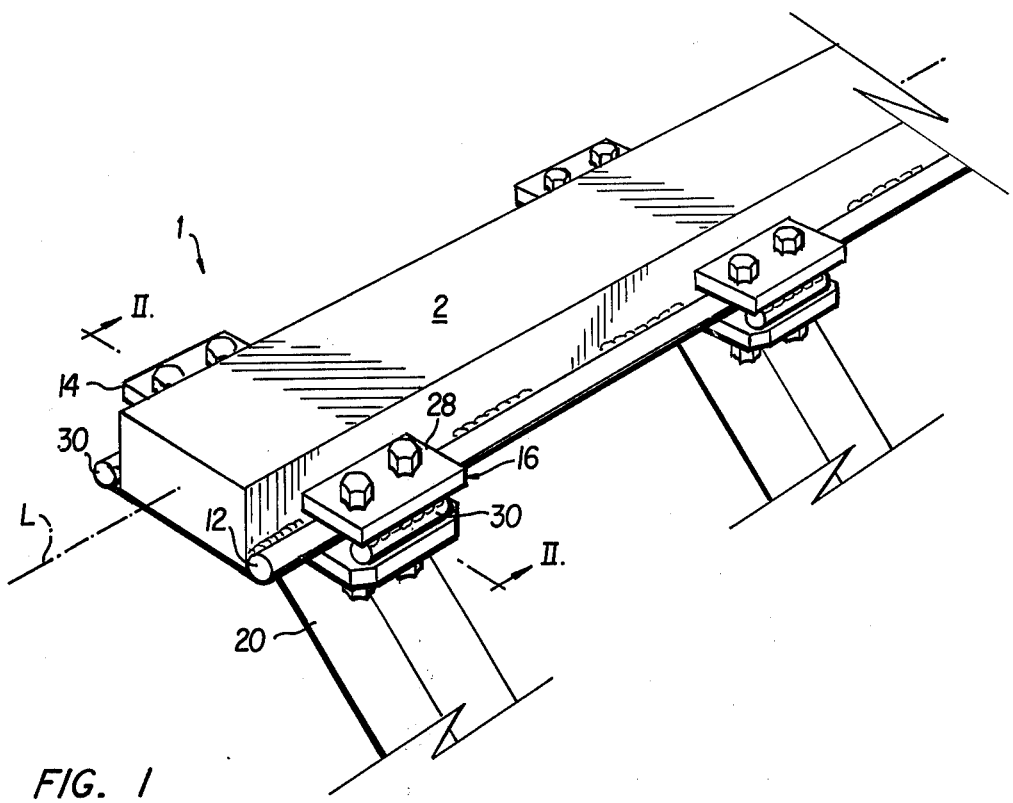
FIG. 1 is a perspective view of the mounting assembly of the present invention.

FIG. 1 serves to illustrate the connecting assembly 1 for an agricultural implement which includes a frame member 2 having a lower surface portion 4 and adjacent opposing side portions 6, 8. A pair of flange members 10, 12, here shown as rod members welded to frame member 2, extend from opposing sides 6, 8 and are positioned at a point adjacent lower surface portion 4.

Figure 2:
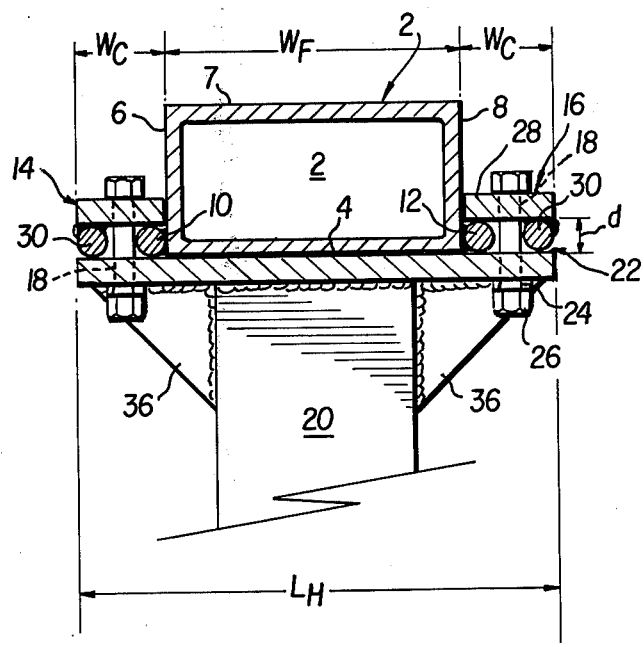
FIG. 2 is a cross-sectional view taken along line II—II of the mounting member of FIG. 1.

A plurality of L-shaped clamp members 14, 16 for engaging the flange members 10, 12 are also provided. Each of the flange members 10, 12 and clamp members 14, 16 are provided with apertures 18 as best shown in FIG. 2 in opposing relationship. A support member 20 for mounting an agricultural implement is also provided and which includes an upper surface portion 22 engaging the lower surface portion 4 of frame 2. It should also be noted that in the preferred embodiment illustrated, frame 2 is in the form of a rectangular cross-sectional tubing which includes an upper surface 7. Upper surface portion 22 of support member 20 also engages clamp members 14, 16 and further has apertures 18 formed therein which are disposed opposite the apertures in the clamp members 14, 16.

Securing members, which may be in the form of bolts 24 and nuts 26 or any other conventional members, are mounted within the apertures 18 of the clamp members 14, 16 and the support member 20. Furthermore, the securing members are disposed between the flange members 10, 12 and the clamp members 16, 14, respectively, for connecting the support member 20 and the frame member 2.

Each of the L-shaped clamp members 14, 16 are positioned along the longitudinal axis L of frame member 2 as best shown in FIG. 1. Evenso, it is contemplated that sufficiently long clamp members 14, 16 could be disposed on either side of the frame member 2 so as to provide adequate support for support member 20. Should, however, a plurality of clamp members 14, 16 be utilized, either a single upper surface portion 22 of support member 20 can be engaged therewith or a series of upper surface portions as shown in FIG. 1.

Engagement of the surface portions of the respective members discussed hereinabove is best explained with reference to FIG. 2 wherein it is shown that the length dimension $L_H$ of the upper surface portion 22 of support member 20 is substantially equal to the combined width of the clamp members 14, 16 ($L_H + W_C$) and the lower surface portion 4 ($W_F$) portion of frame member 2.

Each of the clamp members 14, 16 may include a base or bar member 28 and a corresponding leg or rod member 30 mounted to bar member 28 so as to form a L-shaped clamp member. Evenso, it is again to be noted that the clamp members may be unitarily formed in a single piece or separately produced and subsequently connected as shown in FIG. 2. For proper distribution of loading forces, the diameter of rod members 10, 12 and 30, 30 are substantially equal. Should a member other than a rod member be utilized, the height of such member would be proportionally equal.

To provide an even greater resistance to stress and strain, support plates 36 can also be mounted to support member 20 so as to further support the end portions of upper surface 22 as shown in FIG. 2.

Figure 3:
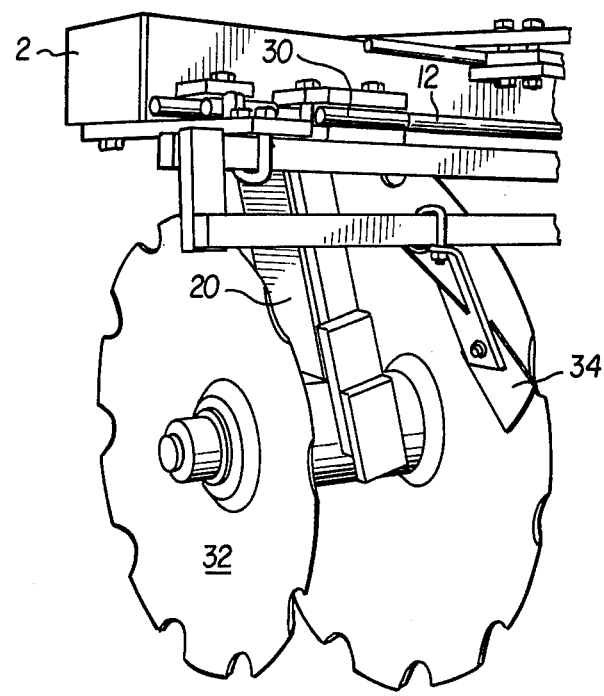
FIG. 3 is an elevational view of the assembled frame member and agricultural implement of the present invention.

FIG. 3 serves to illustrate the manner in which an agricultural implement in the form of a disk 32 can be mounted to the frame 2. In a similar fashion, a scraper member 34 can be mounted from the frame member 2 so as to cooperate with disk 32 in the cleaning thereof.

In operation, the mounting assembly is constructed in the following manner. The support member 20 is initially positioned such that upper surface 22 thereof engages with lower surface 4 of tubing 2 and which also engages flange members 10, 12. Subsequently, clamp members 14, 16 are positioned so as to align the apertures 18 of upper surface 22 with apertures 18 formed in clamp members 14, 16. As shown in FIG. 2, the lower surface portion of bar member 28 engages an upper portion of flange members 10, 12 with the lower portions of rod members 30 engaging upper surface portion 22 of support member 20. The securing members are then mounted within the apertures 18 and tightened so as to provide a rigid support for support member 20 to frame 2. As discussed hereinabove, both disk 32 and scraper member 34 can be mounted to the frame utilizing the above-noted structural elements. Evenso, it should be noted that the mounting assembly discussed hereinabove is not limited to the mounting of agricultural implements and can be utilized in connecting any type of support member to a frame member.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A connecting assembly comprising:
   a frame member having a first flat surface portion and adjacent opposing side portions;
   at least one pair of flange members extending from said opposing side portions adjacent said flat surface;
   at least one pair of L-shaped clamp members engaging said at least one pair of flange members, each having apertures formed therein and each having a base and a leg portion extending from said base;
   a support member having at least one flat surface portion engaging said first flat surface portion of said frame member and said leg portions of said at least one pair of L-shaped clamp members and including first and second apertures formed therein and disposed opposite said apertures in said at least one pair of L-shaped clamp members; and
   securing means mounted within said apertures of said at least one pair of L-shaped clamp members and said support member and disposed between said at least one pair of flange members and said leg portions of said at least one pair of L-shaped clamp members, respectively, for connecting said support member and said frame member.

2. A connecting assembly as set forth in claim 1 wherein said at least one pair of L-shaped clamp members comprises a plurality of L-shaped clamp members.

3. A connecting assembly as set forth in claim 2 wherein said plurality of L-shaped clamp members are disposed along the longitudinal axis of said frame member.

4. A connecting assembly as set forth in claim 2 wherein said at least one surface portion of said support member comprises a plurality of surface portions.

5. A connecting assembly as set forth in claim 1 wherein the width dimension of said at least one surface portion of said support member is substantially equal to the combined widths of said at least one pair of L-shaped clamp members and said first surface portion of said frame member.

6. A connecting assembly as set forth in claim 1 wherein each of said at least one pair of L-shaped clamp members comprises a bar member and a rod member mounted to said bar member.

7. A connecting assembly as set forth in claim 1 wherein said securing means comprises a bolt and nut assembly.

8. A connecting assembly comprising:
   a frame member having a first surface portion and adjacent opposing side portions;
   at least one pair of flange members extending from said opposing side portions;
   at least one pair of L-shaped clamp members engaging said at least one pair of flange members, each having apertures formed therein;
   a support member having at least one surface portion engaging said first surface portion of said frame member and said at least one pair of L-shaped clamp members and including first and second apertures formed therein and disposed opposite said apertures in said at least one pair of L-shaped clamp members; and
   securing means mounted within said apertures of said at least one pair of L-shaped clamp members and said support member and disposed between said at least one pair of flange members and said at least one pair of L-shaped clamp members, respectively, for connecting said support member and said frame member wherein each of said at least one pair of flange members comprises a rod member mounted to said opposing side portions of said frame member adjacent said first surface portion.

9. A connecting assembly as set forth in claim 8 wherein each of said at least one pair of L-shaped clamp members comprises a bar member and a rod member mounted to said bar member.

10. A connecting assembly as set forth in claim 9 wherein the diameter of said rod member mounted to said opposing side portions of said frame member and of said rod member mounted to said bar member are equal.

11. A mounting assembly for an agricultural implement comprising:
   a frame member having a flat lower surface portion and adjacent opposing side portions;
   at least one pair of flange members extending from said opposing side portions adjacent said lower surface;
   at least one pair of L-shaped clamp members engaging said at least one pair of flange members, each having apertures formed therein and each having a base and a leg portion extending from said base;
   a support member for mounting said agricultural implement having an upper flat surface portion engaging said flat lower surface portion of said frame member and said leg portions of said at least one pair of L-shaped clamp members and including first and second apertures formed therein and disposed opposite said apertures in said at least one pair of L-shaped clamp members; and
   securing means mounted within said apertures of said at least one pair of L-shaped clamp members and said support member and disposed between said at least one pair of flange members and said leg portions of at least one pair of L-shaped clamp members, respectively, for mounting said agricultural implement to said frame member.

12. A mounting assembly for an agricultural implement as set forth in claim 11 wherein said at least one pair of L-shaped clamp members comprises a plurality of L-shaped clamp members.

13. A mounting assembly for an agricultural implement as set forth in claim 12 wherein said plurality of L-shaped clamp members are disposed along the longitudinal axis of said frame member.

14. A mounting assembly for an agricultural implement as set forth in claim 12 wherein said upper surface portion of said support member comprises a plurality of surface portions.

15. A mounting assembly for an agricultural implement as set forth in claim 11 wherein the width dimension of said upper surface portion of said support member is substantially equal to the combined width of said at least one pair of L-shaped clamp members and said lower surface portion of said frame member.

16. A mounting assembly for an agricultural implement as set forth in claim 11 wherein each of said at least one pair of L-shaped clamp members comprises a bar member and a rod member mounted to said bar member.

17. A mounting assembly for an agricultural implement as set forth in claim 11 wherein said securing means comprises a bolt and nut assembly.

18. A mounting assembly for an agricultural implement comprising:
- a frame member having a lower surface portion and adjacent opposing side portions;
- at least one pair of flange members extending from said opposing side portions adjacent said lower surface;
- at least one pair of L-shaped clamp members engaging said at least one pair of flange members, each having apertures formed therein;
- a support member for mounting said agricultural implement having an upper surface portion engaging said lower surface portion of said frame member and said at least one pair of L-shaped clamp members and including first and second apertures formed therein and disposed opposite said apertures in said at least one pair of L-shaped clamp members; and
- securing means mounted within said apertures of said at least one pair of L-shaped clamp members and said support member and disposed between said at least one pair of flange members and said at least one pair of L-shaped clamp members, respectively, for mounting said agricultural implement to said frame member wherein each of said at least one pair of flange members comprises a rod member mounted to said opposing side portions of said frame member adjacent said lower surface portion.

19. A mounting assembly for an agricultural implement as set forth in claim 18 wherein each of said at least one pair of L-shaped clamp members comprises a bar member and a rod member mounted to said bar member.

20. A mounting assembly for an agricultural implement as set forth in claim 19 wherein the diameter of said rod member mounted to said opposing side portions of said frame and of said rod member mounted to said bar member are equal.

* * * * *